(12) United States Patent
Pinarbasi

(10) Patent No.: US 7,064,935 B2
(45) Date of Patent: Jun. 20, 2006

(54) MAGNETORESISTIVE SENSOR HAVING LEADS WITH VERTICAL END WALLS

(75) Inventor: Mustafa Michael Pinarbasi, Morgan Hill, CA (US)

(73) Assignee: Hitachi Global Storage Technologies Netherland B.V., Amsterdam (NL)

( * ) Notice: Subject to any disclaimer, the term of this patent is extended or adjusted under 35 U.S.C. 154(b) by 145 days.

(21) Appl. No.: 10/464,253

(22) Filed: Jun. 17, 2003

(65) Prior Publication Data

US 2004/0257713 A1  Dec. 23, 2004

(51) Int. Cl.
  *G11B 5/39*  (2006.01)
(52) U.S. Cl. .................................... 360/322
(58) Field of Classification Search ............... 360/322, 360/324.1, 324.11, 324.12, 324.2, 317
See application file for complete search history.

(56) References Cited

U.S. PATENT DOCUMENTS

| | | | |
|---|---|---|---|
| 6,219,208 B1 | 4/2001 | Gill ...................... 360/324.1 |
| 6,219,210 B1 | 4/2001 | Pinarbasi ............. 360/324.11 |
| 6,262,869 B1 | 7/2001 | Lin et al. ............. 360/324.11 |
| 6,344,953 B1 * | 2/2002 | Kautzky et al. ............ 360/322 |
| 6,396,671 B1 | 5/2002 | Horng et al. ............. 360/324.1 |
| 6,396,734 B1 | 5/2002 | Ishikawa et al. ............ 365/158 |
| 6,404,191 B1 | 6/2002 | Daughton et al. ........... 324/252 |
| 6,449,134 B1 | 9/2002 | Beach et al. ........... 360/324.12 |
| 6,460,243 B1 * | 10/2002 | Pinarbasi ................. 29/603.14 |
| 6,570,745 B1 * | 5/2003 | Gill ........................ 360/324.12 |
| 6,643,107 B1 * | 11/2003 | Hasegawa et al. ....... 360/324.1 |
| 6,665,153 B1 * | 12/2003 | Hayashi ...................... 360/322 |
| 6,744,607 B1 * | 6/2004 | Freitag et al. .............. 360/322 |
| 2002/0135953 A1 | 9/2002 | Gill ........................ 360/324.12 |
| 2002/0135954 A1 | 9/2002 | Yoshikawa et al. .... 360/324.12 |
| 2003/0030434 A1 * | 2/2003 | Hasegawa et al. ......... 324/252 |
| 2003/0053265 A1 * | 3/2003 | Terunuma et al. .......... 360/322 |
| 2003/0189798 A1 * | 10/2003 | Lin et al. .................... 360/322 |
| 2003/0189799 A1 * | 10/2003 | Yanagisawa et al. ....... 360/322 |
| 2004/0052005 A1 * | 3/2004 | Zolla et al. ................. 360/322 |
| 2004/0061982 A1 * | 4/2004 | Lin et al. ................. 360/324.1 |

* cited by examiner

Primary Examiner—Jefferson Evans
(74) Attorney, Agent, or Firm—Zilka-Kotab, PC

(57) ABSTRACT

A lead overlay magnetoresistive sensor has leads with substantially vertical end walls to accentuate sense current near the ends of the leads. Insulating layers isolate the hard bias layers from the path of the sense current. A lead overlay magnetoresistive sensor does not exhibit significant track-width widening. A disk drive has a read element including a lead overlay magnetoresistive sensor with leads having substantially vertical end walls.

10 Claims, 8 Drawing Sheets

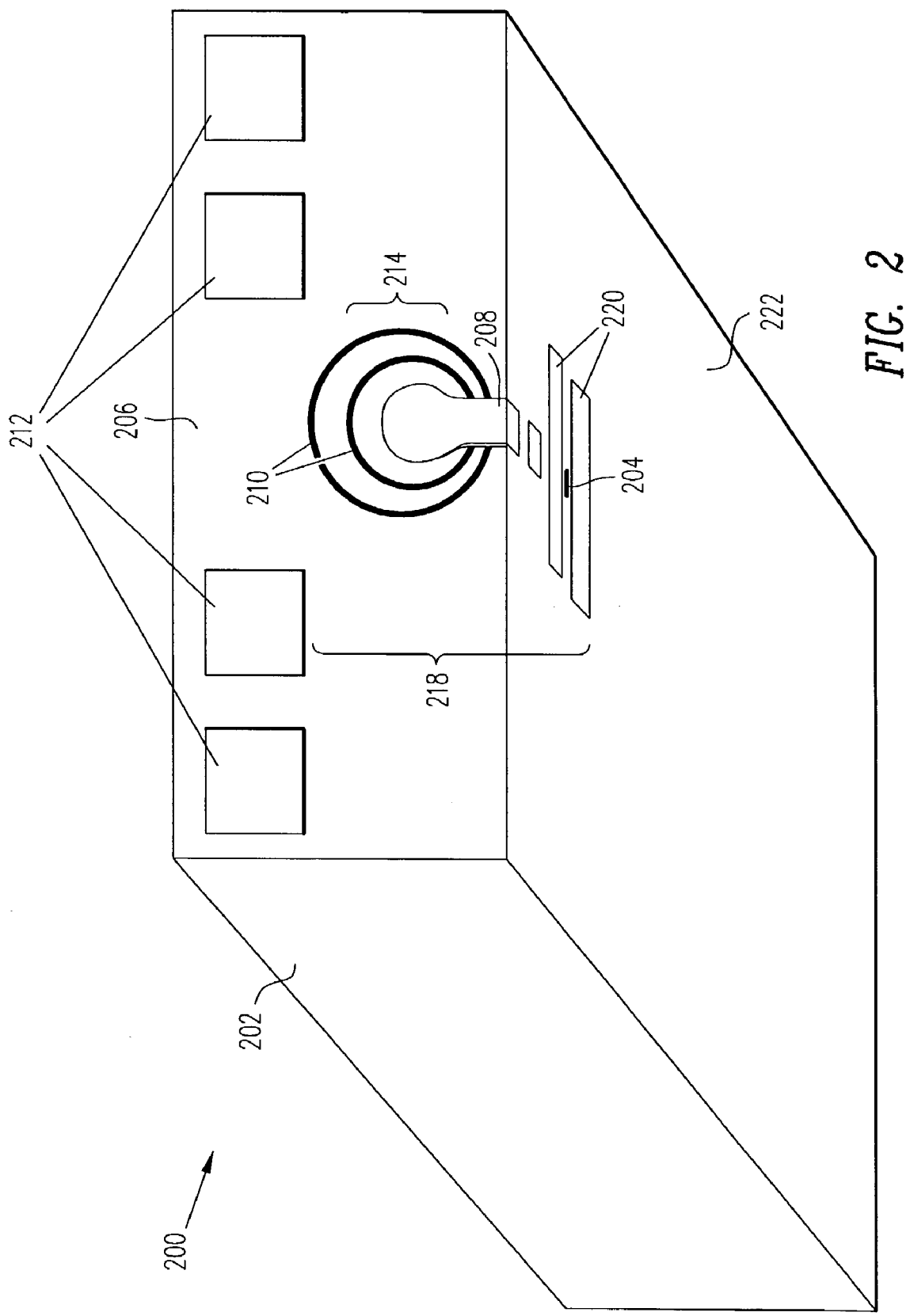

MAGNETORESISTIVE SENSOR HAVING LEADS WITH VERTICAL END WALLS

BACKGROUND OF THE INVENTION

1. Field of the Invention

The invention relates to a magnetoresistive sensor, typically used in a magnetic disk drive; and, more specifically, the invention relates to a lead overlay magnetoresistive sensor having high sensitivity and high spatial resolution.

2. Description of the Background Art

Disk drives using magnetic recording of digital information store most of the data in contemporary computer systems. A disk drive has at least one rotating disk with discrete concentric tracks of data. Each disk drive also has at least one recording head typically having a separate write element and read element for writing and reading the data on the tracks. The read element in most contemporary disk drives includes a magnetic spin valve sensor. A magnetic spin valve sensor includes a sandwich of layers, also known as a sensor stack, including a ferromagnetic pinned layer, a nonmagnetic electrically conducting layer, and a ferromagnetic free layer. The resistance of the spin valve sensor changes with respect to the direction and magnitude of an applied magnetic field such as the field from a written magnetic transition on a disk. To detect the change in resistance, sense current is passed through the sensor through electrical leads. The electrical leads are also known as lead layers, or more simply, leads. Typically, hard bias material is disposed in layers near the ends of a sensor stack forming permanent magnets which impose a weak magnetic biasing field on the sensor stack.

A lead overlay magnetoresistive sensor has lead layers which overlay portions of the sensor stack. This arrangement offers the advantage that the effective trackwidth of the sensor is determined primarily by the distance between the two leads and not by the width of the sensor stack. In other magnetoresistive sensors the trackwidth also depends on such factors as the lateral dimension of the sensor stack and the extent of magnetic hardening from the bias layers. Thus the lead overlay sensor offers an advantage of determining the trackwidth with one simple geometric parameter.

However, in practice, lead overlay sensors are subject to effective trackwidth widening due to sense current leakage from the leads into the sensor stack and hard bias layers away from the immediate vicinity of the active portion of the sensor stack. This effective trackwidth widening tends to decouple the relationship between the distance between leads and the effective trackwidth thus degrading one of the important potential advantages of a lead overlay sensor. Sense current leakage also adds parasitic resistance unrelated to magnetic signal and thus effectively degrades sensitivity.

Accordingly, what is needed is a lead overlay magnetoresistive sensor which concentrates most of the sense current through the ends of the leads in the immediate vicinity of the active portion of the sensor stack.

SUMMARY OF THE INVENTION

In a preferred embodiment, the invention provides a lead overlay magnetoresistive sensor that minimizes sense current leakage. A lead overlay sensor according to the invention exhibits very little trackwidth widening thus increasing spatial resolution and allowing more narrow trackwidth sensors to be realized. In addition, a lead overlay sensor according to the invention exhibits minimal parasitic resistance thus increasing sensitivity.

In one embodiment, a magnetoresistive sensor includes leads which have substantially vertical end walls. Sense current in the leads is thus not constricted near the active portion of the sensor stack. In addition, the leads may have a substantially planar upper surface in the vicinity of the active portion of the sensor stack. In another embodiment, a magnetoresistive sensor includes insulating layers which effectively insulate the hard bias layers from sense current. In another embodiment, a disk drive is provided wherein the read element includes a lead overlay sensor according to the invention.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 2 illustrates a view (not necessarily to scale) of a slider and recording head having a lead overlay magnetoresistive sensor according to the present invention;

FIG. 4a illustrates a view of the layers of a sensor stack as deposited on a substrate;

FIG. 4b illustrates a view of the sensor and a photoresist liftoff structure before ion milling;

FIG. 4c illustrates a view of the sensor after ion milling;

FIG. 4d illustrates a view of the sensor after deposition of a first thin insulating layer;

FIG. 4e illustrates a view of the sensor after formation of the hard bias material followed by deposition of a second thin insulating layer;

FIG. 4f illustrates the formation of a photoresist layer;

FIG. 4g illustrates a view of the sensor after deposition of the lead material; and, FIG. 4h illustrates a view of the completed sensor.

DETAILED DESCRIPTION OF THE INVENTION

As shown in the figures for purposes of illustration and described in detail in this section, the invention is embodied in a novel lead overlay magnetoresistive sensor having low resistance between the leads and the sensor stack. The sensor thus disclosed has minimal trackwidth widening thus enabling the achievement of very small trackwidths. The invention is also embodied in a disk drive having a read element including a novel lead overlay magnetoresistive sensor.

Figure 1:
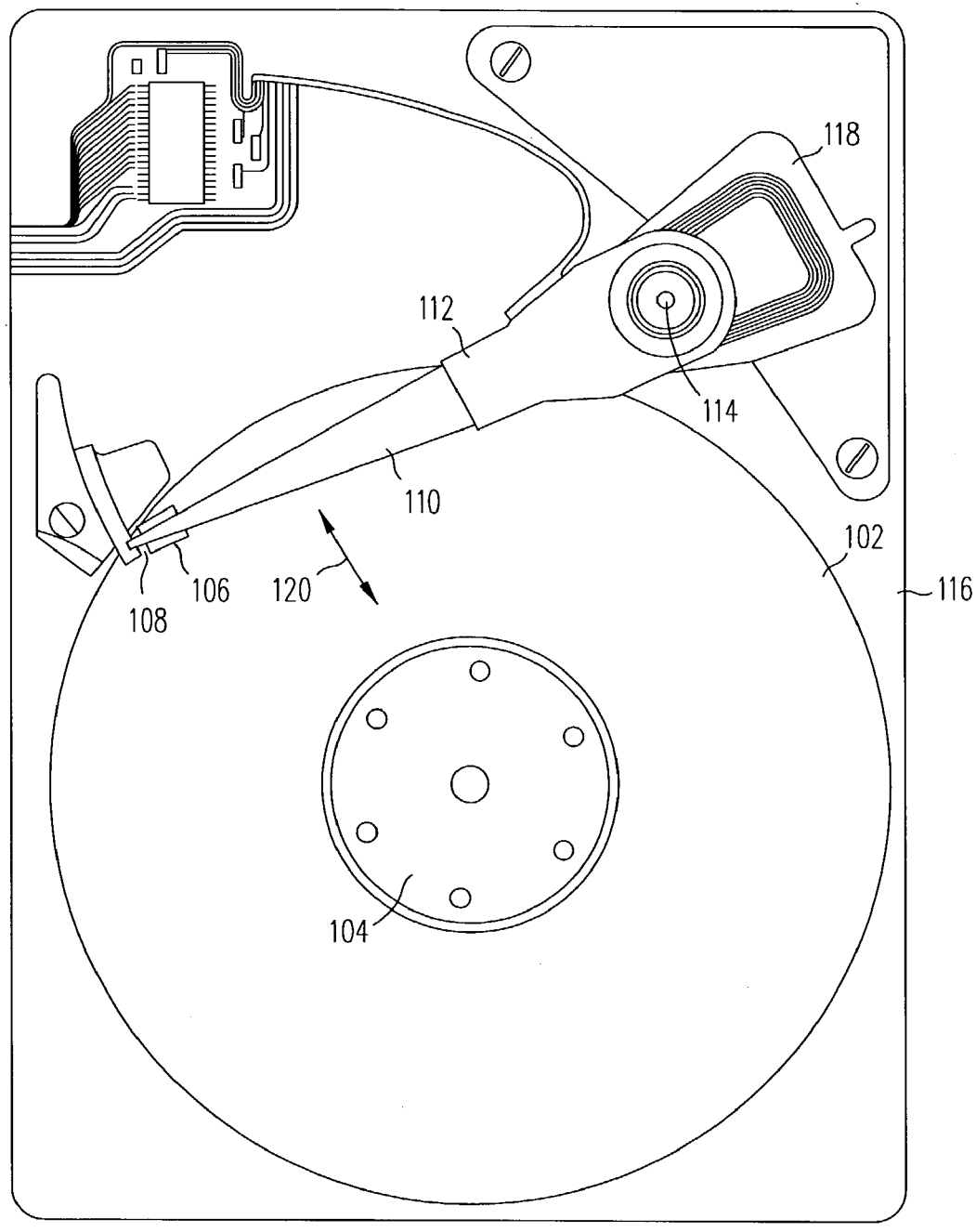
FIG. 1 illustrates a view of a disk drive having a lead overlay magnetoresistive sensor according to the present invention.

Referring to FIG. 1, a magnetic disk drive 100 has at least one rotatable magnetic disk 102 supported by a spindle 104 and rotated by a motor (not shown). There is at least one slider 106 with an attached recording head 108 positioned over the disk 102 surface while reading and writing. The recording head 108 includes a write element for writing data onto the disk 102. The recording head also includes a magnetic spin valve sensor according to the present invention (shown in detail below) used as a read element for reading data from the disk. The slider 106 is attached to a suspension 110 and the suspension 110 is attached to an actuator 112. The actuator 112 is pivotally attached 114 to the housing 116 of the disk drive 100 and is pivoted by a voice coil motor 118. As the disk is rotating, the actuator 112 positions the slider 106 and suspension 110 along a radial arcuate path 120 over the disk 102 surface to access the data track of interest.

Again referring to FIG. 1, during operation of the disk drive 100, the motion of the rotating disk 102 relative to the slider 106 generates an air bearing between the slider 106 and the disk 102 surface which exerts an upward force on the slider 106. This upward force is balanced by a spring force from the suspension 110 urging the slider 106 toward the surface of the disk 102. Alternatively, the slider 106 may be in either partial or continuous contact with the disk 102 surface during operation.

FIG. 2 illustrates a more detailed view of a slider 200. The recording head 218 is preferably constructed on the trailing surface 206 of the slider 200. FIG. 2 illustrates the upper pole 208 and the turns 210 of the coil 214 of the write element of the recording head 218. The read element includes a read sensor 204 disposed between two magnetic shields 220 is formed between the slider body 202 and the write element. The electrical connection pads 212 which allow connection with the write element and read element are illustrated. The disk facing portion 222 of the slider 200 typically has an air bearing (not shown). The disk facing view of the recording head 218 is the view on the disk facing portion 222 of the slider 200.

Figure 3A:
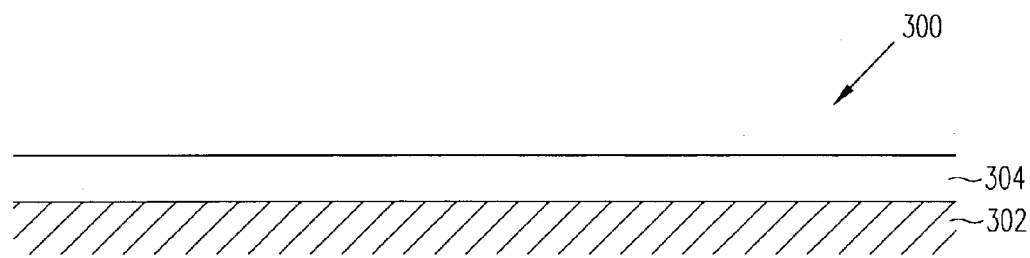
FIGS. 3a–e illustrate views of a lead overlay magnetoresistive sensor according to the prior art during several manufacturing steps.
Figure 3B:
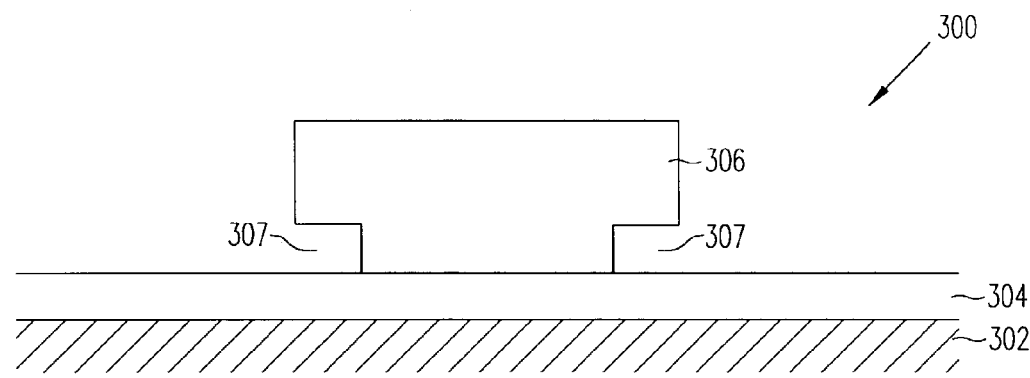

FIGS. 3a–f illustrate disk facing views of a lead overlay magnetoresistive head 300 according to the prior art at several stages during manufacture. FIG. 3a illustrates a view of the layers of the sensor stack 304 as deposited on a suitable substrate 302 such as alumina. FIG. 3b illustrates a first photoresist liftoff structure 306 formed over the layers of the sensor stack 304. A photoresist liftoff structure 306, a cross sectional view of which is illustrated in FIG. 3b, is constructed by patterning two layers of photoresist having somewhat different properties. After patterning there is an undercut portion 307 which facilitates removal after subsequent process steps such as ion milling or deposition of material over the structure. Photoresist liftoff structures are well known to those skilled in the art.

Figure 3C:
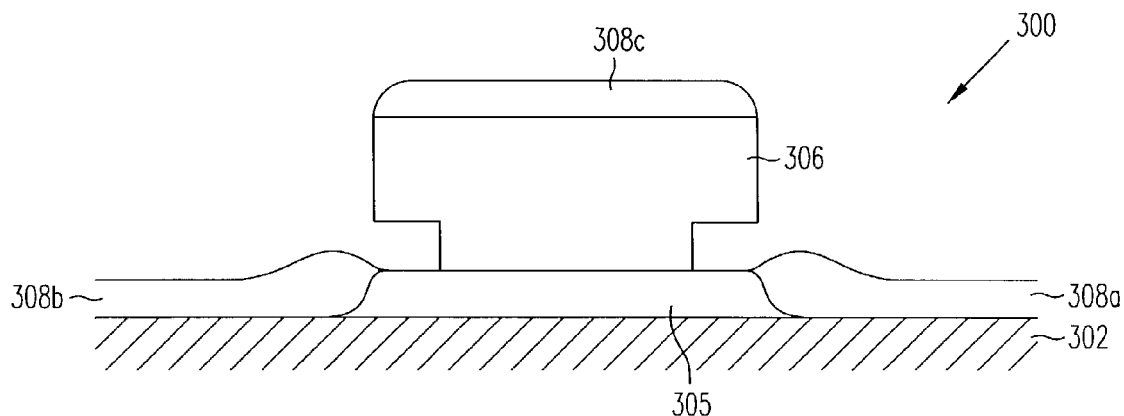

FIG. 3c illustrates a view of the sensor 300 after ion milling which leaves a portion 305 of the original layers of the sensor stack (304 in FIG. 3a). Henceforth, the portion 305 will be referred to as the sensor stack. FIG. 3c also illustrates the formation of hard bias layers 308a, 308b, 308c onto the sensor 300. The hard bias layers 308a, 308b, 308c are deposited in one operation but exist as separate portions and will therefore be referred to as separate layers. The material in the hard bias layers 308a, 308b, typically an alloy of cobalt, platinum, and chromium, form permanent magnets which are used to impose a weak magnetic biasing field on the sensor stack 305.

Figure 3D:
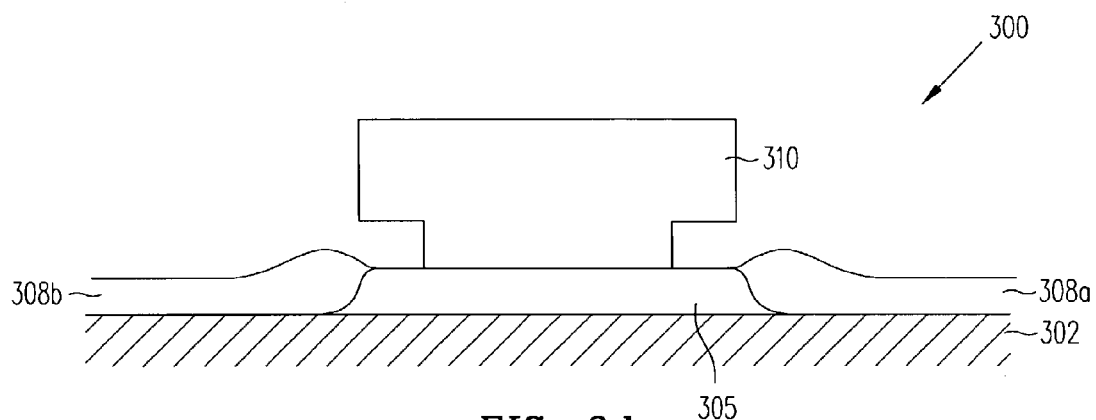
Figure 3E:
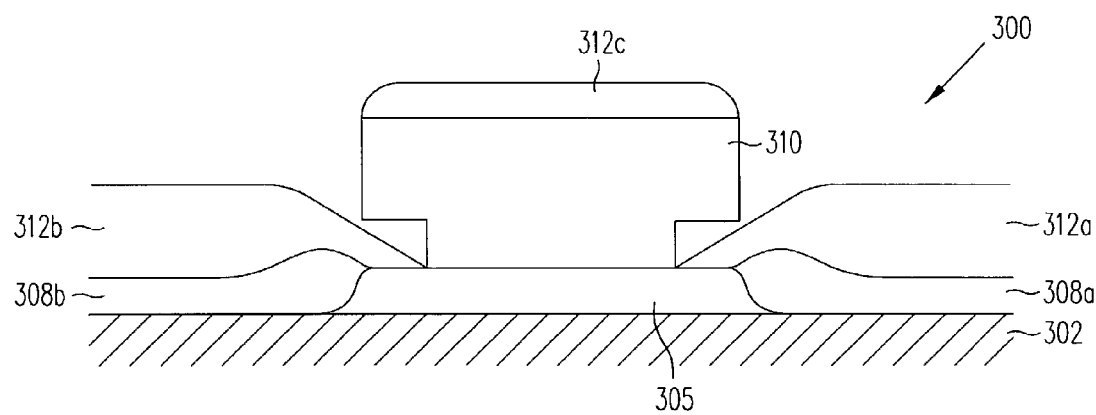

FIG. 3d illustrates a view of the sensor 300 after liftoff or removal of the first photoresist liftoff structure 306. A portion of the hard bias material 308c was removed along with the first photoresist liftoff structure 306. The remaining hard bias layers 308a, 308b form the permanent magnets on each side of the sensor stack 305. FIG. 3d also illustrates a view of a second photoresist liftoff structure 310 which is more narrow than the first photoresist liftoff structure 306. FIG. 3e illustrates a view of the sensor 300 after deposition of lead material 312a, 312b, 312c.

Figure 3F:
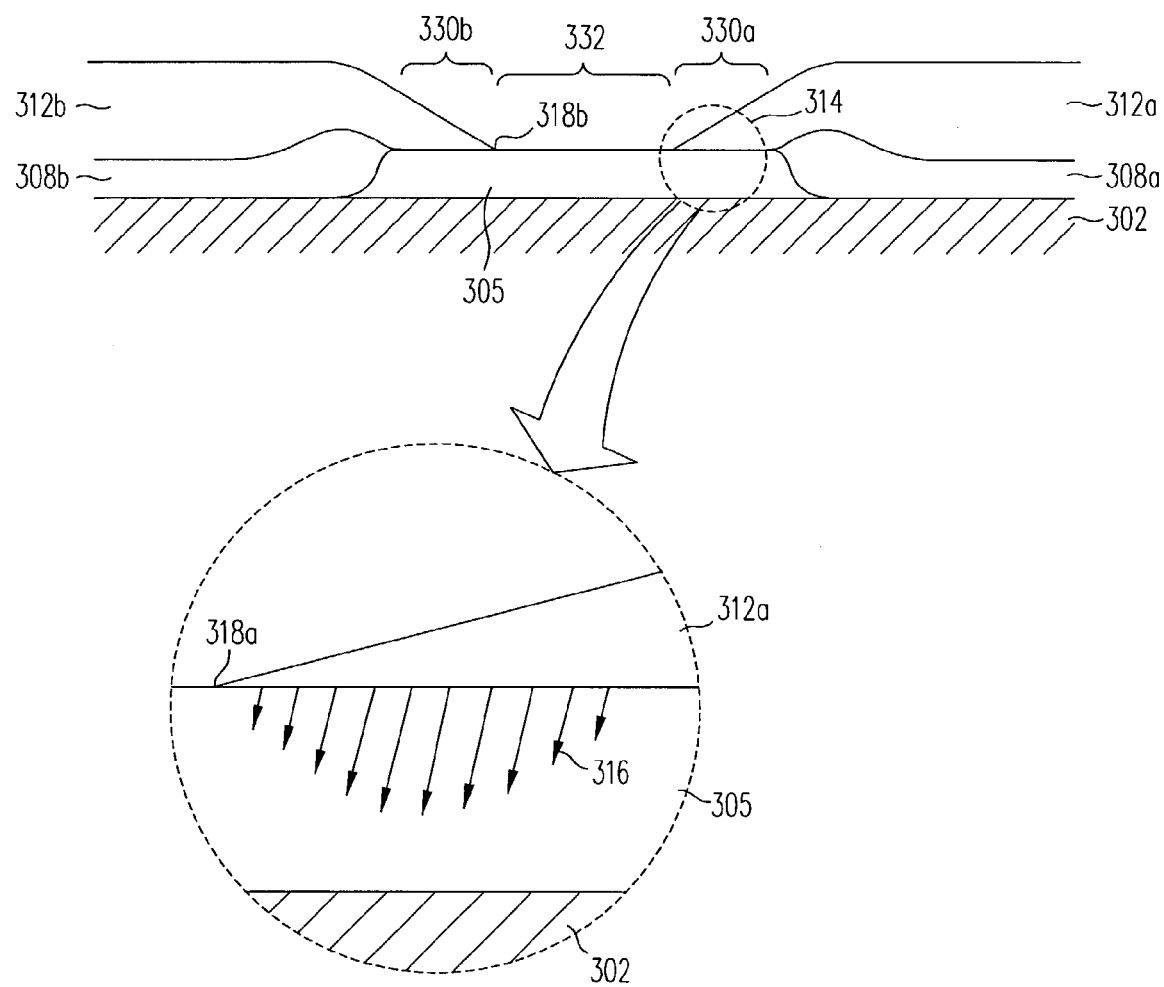
FIG. 3f illustrates a view of a completed lead overlay magnetoresistive sensor according to the prior art and a current profile from a lead to a sensor stack.

FIG. 3f illustrates a view of the completed sensor 300. The sense current in the completed sensor 300 illustrated in FIG. 3f flows through the leads 312a, 312b and sensor stack 305. The thickness of the portions of the leads 312a, 312b which overlay the sensor stack 305 taper down near the ends 318a, 318b. This tapering increases the resistance of the leads 312a, 312b near the ends 318a, 318b. Because the resistance increases near the ends 318a, 318b the current distribution 316 is not concentrated at the ends 318a, 318b of the leads 312a, 312b but instead is distributed over most of the overlay portions 330a, 330b. The arrows 316 in the insert 314 of FIG. 3f represents the distribution of sense current from one of the leads 312a into the sensor stack 305. The current distribution 316 is not sharply distributed near the end 318a of the lead 312a. The effect of the distribution 316 of current is to widen the active portion 332 of the sensor stack 305. The desired active portion 332 of the sensor stack 305 is the portion of the sensor stack 305 between the ends 318a, 318b of the leads 312a, 312b. Another path that current may take in the completed sensor 300 is from the leads 312a, 312b into the hard bias material 308a, 308b and subsequently into the sensor stack 305. Sense current passing through the sensor stack outside the desired active portion is not desirable and results in a loss of spatial resolution (trackwidth widening) and a degradation of sensitivity.

An embodiment of the present invention provides a lead overlay magnetoresistive sensor wherein the sense current from the leads to the sensor stack is concentrated very near the desired active portion of the sensor stack. In one embodiment, the leads have substantially vertical end walls. In another embodiment, the sensor additionally has insulating layers which restrict the sense current flow through the hard bias layers. FIGS. 4a–h illustrate (not necessarily to scale) disk facing views of a magnetoresistive sensor 400 according to the invention during one set of manufacturing steps.

Figure 4A:
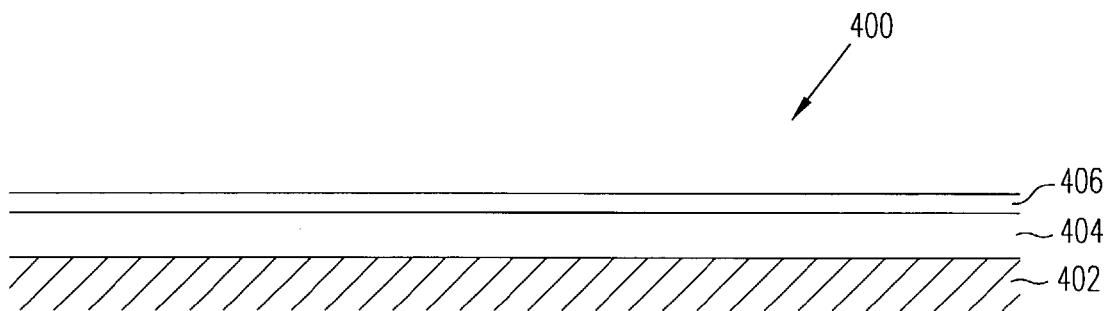
FIGS. 4a–h illustrates disk facing views of a lead overlay magnetoresistive sensor (not necessarily to scale) according to the present invention during several manufacturing steps.
Figure 4B:
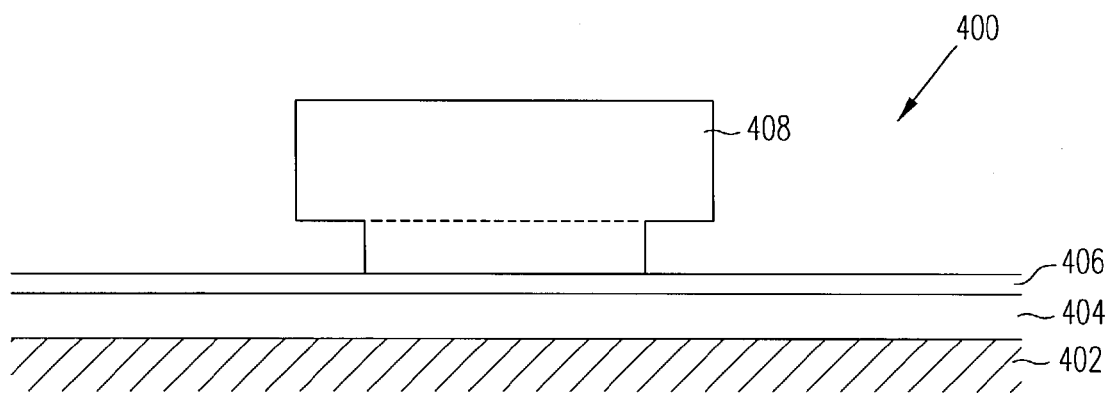
Figure 4C:
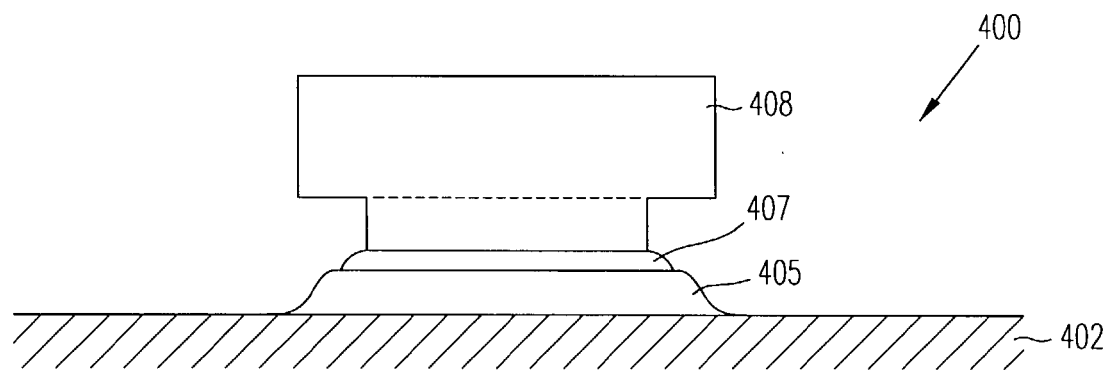

FIG. 4a illustrates a view of the layers 404 of a sensor stack disposed over a substrate 402. A conductive cap layer 406 of ruthenium or other suitable material is formed over the sensor stack 404 to minimize the resistance between the layers 404 of the sensor stack and the leads (illustrated below). FIG. 4b illustrates a view of a photoresist liftoff structure 408 formed over the layers 404 of the sensor stack. FIG. 4c illustrates a view of the sensor 400 after ion milling. A portion 405 of the layers of the sensor stack, hereinafter referred to as the sensor stack 405, and a portion 407 of the conduction cap layer remain after ion milling.

Figure 4D:
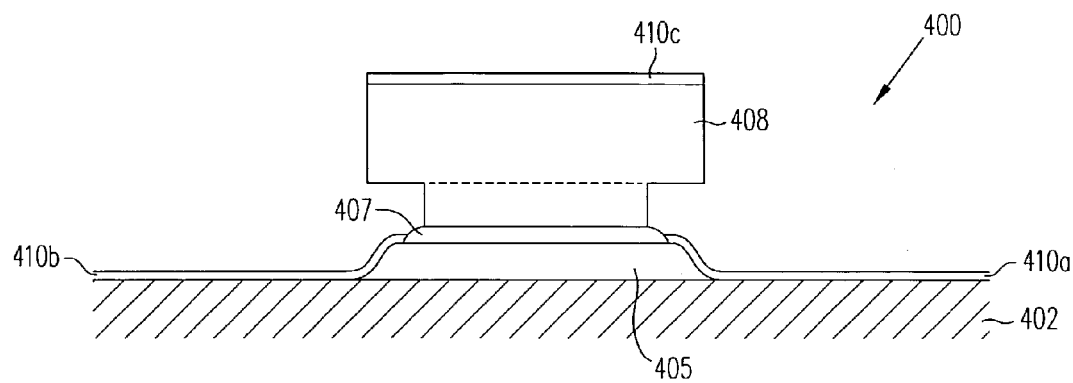
Figure 4E:
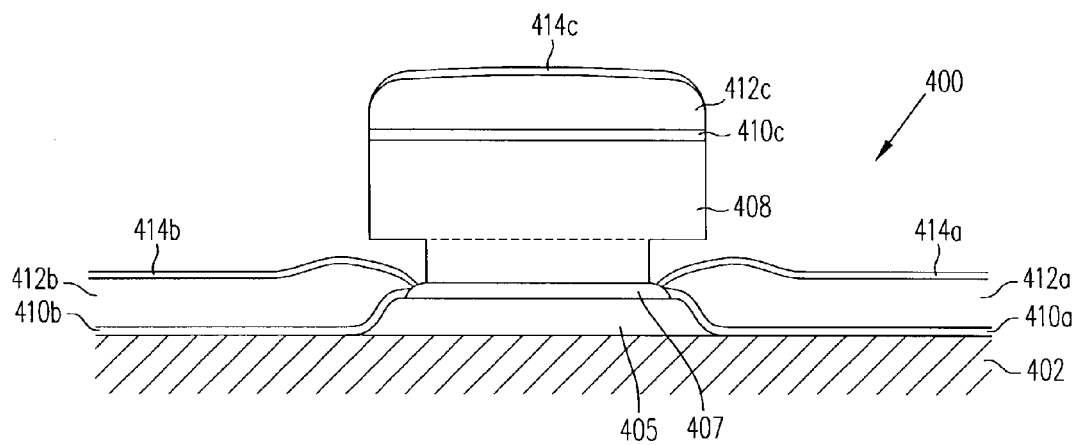

FIG. 4d illustrates a view of the sensor 400 after simultaneous deposition of a first thin layer of insulating material such as alumina or the like. The thin layer of insulating material has three portions 410a, 410b, 410c after deposition. FIG. 4e illustrates a view of the sensor 400 after deposition of hard bias material 412a, 412b, 412c and a second thin layer of insulating material 414a, 414b, 414c. The hard bias material forms first and second bias magnets which impose a weak bias field on the sensor stack. The first and second thin insulating layers effectively insulate the layers of hard bias material from sense current. Although the thin insulating material has been formed in two manufacturing steps, it is convenient to refer to each portion 410a, 410b, 414a, 414b as separate layers.

Figure 4F:
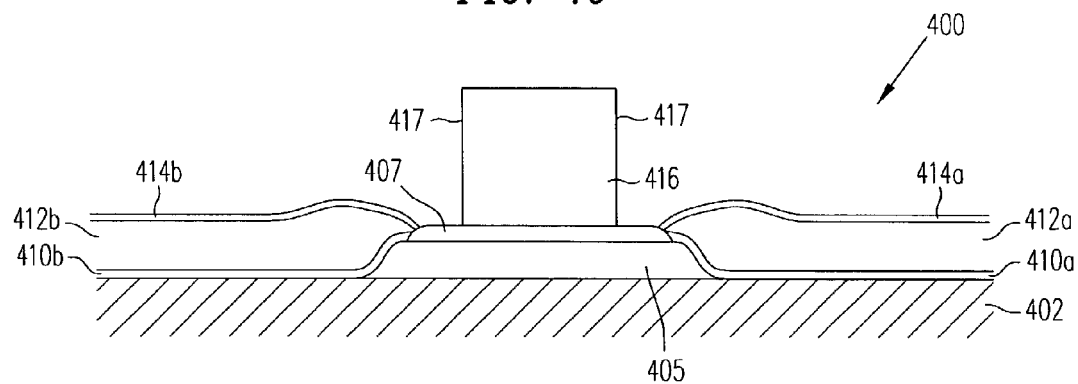
Figure 4G:
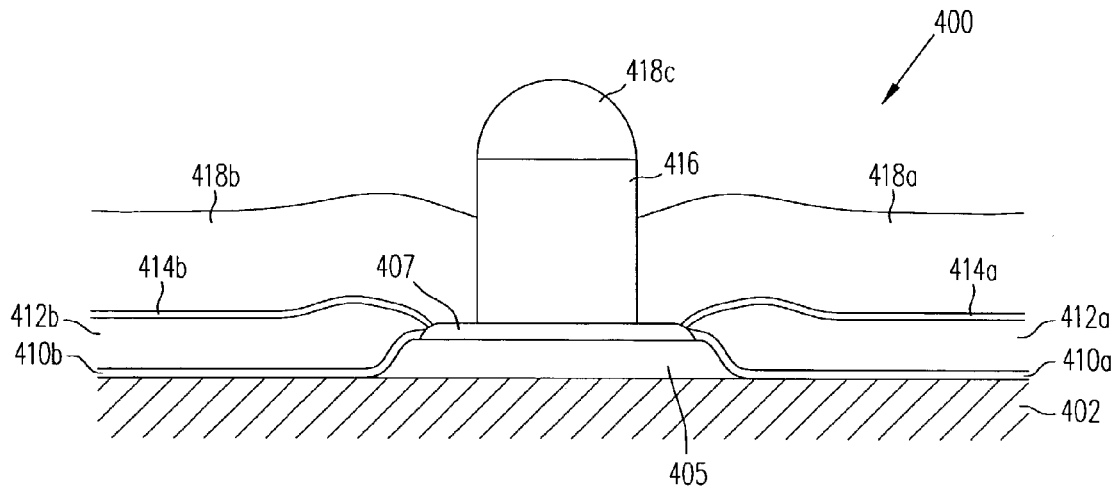

FIG. 4f illustrates a view of the sensor 400 after the photoresist liftoff structure (408 in FIG. 4b) has been removed and a second layer of photoresist 416 has been formed and patterned. The second layer of photoresist 416 does not have the usual undercut liftoff structure. Instead, the second layer of photoresist 416 has substantially vertical walls 417 after patterning. FIG. 4g illustrates a view of the sensor 400 after lead material 418a, 418b, 418c has been formed. Lead material may be conveniently chosen from low resistance, substantially inert conductors such as rhodium, gold, ruthenium, and the like.

Figure 4H:
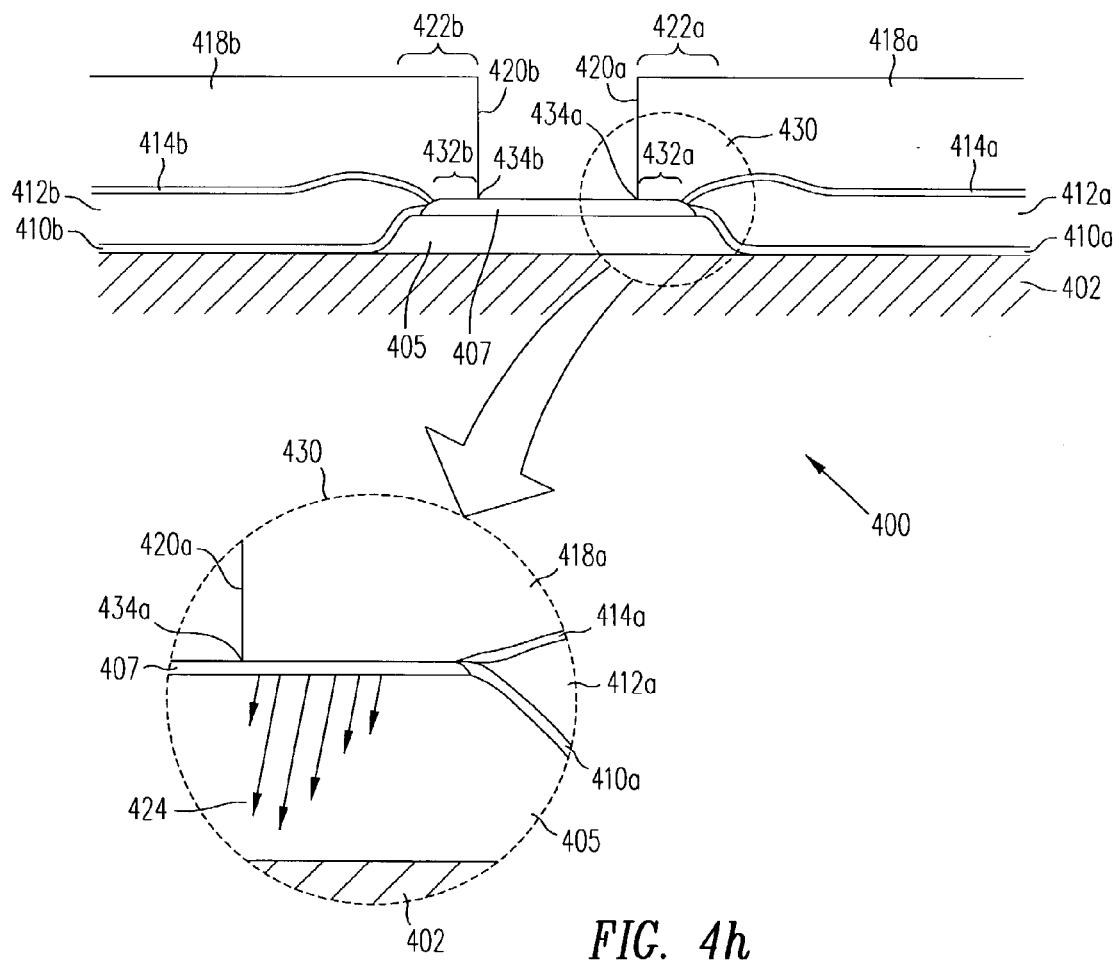

FIG. 4h illustrates a view of the completed sensor 400 after the second layer of photoresist 416 has been removed. The portions 422a, 422b of the leads 418a, 418b which overlay portions 432a, 432b of the sensor stack 405 are preferably planarized with a chemical-mechanical polish (CMP). The completed sensor illustrated in FIG. 4h has leads 418a, 418b with substantially vertical end walls 420a, 420b.

A sensor as exemplified by the illustrated sensor 400 in FIG. 4h has novel features which serve to concentrate sense current very near the active portion of the sensor stack. One novel feature is leads 418a, 418b having substantially vertical end walls 420a, 420b. Because the thickness of the leads 418a, 418b in the present invention do not gently slope down to the ends, the sense current is not presented with progressively higher resistance near the ends 420a, 420b of the leads 418a, 418b. In addition to leads having vertical side walls sense current may be advantageously altered with insulating layers. The first insulating layers 410a, 410b between the hard bias layers 412a, 412b and the sensor stack 405 and the second insulating layers between the leads 418a, 418b and the hard bias layers 412a, 412b essentially eliminate the flow of sense current through the hard bias layers 412a, 412b. The combined effect of these attributes is that sense current from the leads 418a, 418b to the sensor stack 405 to be sharply distributed at the ends 434a, 434b of the leads 418a, 418b. This sharp distribution 424 of sense current is illustrated in the insert 430 of FIG. 4h.

From the foregoing it will be appreciated that the magnetoresistive sensor provided by the invention has a more narrow trackwidth and a lower resistance. The more narrow trackwidth allows a higher recorded density in a disk drive. The lower resistance effectively increases the sensitivity of the sensor because sense current is passed through only the magnetically active portion of the sensor stack. Although specific embodiments of the invention has been described and illustrated, one skilled in the art will recognize other embodiments, not expressly described, but which fall within the scope of the invention.

I claim:

1. A magnetoresistive sensor, comprising:
a sensor stack including a ferromagnetic pinned layer and a ferromagnetic free layer, said sensor stack having a first portion, a second portion, and an active portion, said sensor stack having a first and second end;
a first bias magnet disposed at said first end of said sensor stack and a second bias magnet disposed at said second end of said sensor stack;
a first lead, said first lead overlaying said first portion of said sensor stack and said first hard bias magnet, said first lead having a substantially vertical end wall; and,
a second lead, said second lead overlaying a second portion of said sensor stack and said second hard bias magnet, said second lead having a substantially vertical end wall;
wherein insulating material is disposed between said first hard bias magnet and said first end of said sensor stack and between said second bias magnet and said second end of said sensor stack;
said first lead has a sharp corner defined at an intersection of an upper surface and said end wall thereof;
said second lead has a sharp corner defined at an intersection of an upper surface and said end wall thereof;
said first lead is a single layer;
said second lead is a single layer; and
said first and second leads are the only lead layers present for passing an electrical current through said sensor stack.

2. A magnetoresistive sensor as in claim 1 wherein said first and second lead comprises a metal selected from a group consisting of rhodium, gold, and ruthenium.

3. A magnetoresistive sensor as in claim 1 wherein said first and second leads are in contact with said sensor stack along all points of said first and second portions.

4. A magnetoresistive sensor as in claim 1 wherein said first lead has a substantially planar upper surface over said first portion of said sensor stack and said second lead has a substantially planar upper surface over said second portion of said sensor stack.

5. A magnetoresistive sensor, comprising:
a sensor stack including a ferromagnetic pinned layer and a ferromagnetic free layer, said sensor stack having a first overlay portion, a second overlay portion, and an active portion, said sensor stack having a first and second end, wherein the first and second overlay portions extend from the first and second ends of said sensor stack;
a first bias magnet disposed at said first end of said sensor stack and insulated from said sensor stack with a first thin insulating layer, said first bias magnet having a bump extending upwardly from a top surface thereof and positioned towards said first end of said sensor stack;
a second bias magnet disposed at said second end of said sensor stack and insulated from said sensor stack with a second thin insulating layer, said second bias magnet having a bump extending upwardly from a top surface thereof and positioned towards said second end of said sensor stack;
a first lead, said first lead overlaying said first overlay portion of said sensor stack and said first bias magnet, wherein said first lead is insulated from said first bias magnet with a third insulating layer, wherein ends of said third insulating layer and said first insulating layer taper together and meet towards the first end of said sensor stack; and,
a second lead, said second lead overlaying a second overlay portion of said sensor stack and said second bias magnet, wherein said second lead is insulated from said second bias magnet with a fourth insulating layer, wherein ends of said fourth insulating layer and said second insulating layer taper together and meet towards the second end of said sensor stack.

6. A disk drive, comprising:
a magnetic disk;
a write element for writing information to said disk;
a magnetoresistive sensor for reading information from said disk, wherein said magnetoresistive sensor includes:
a sensor stack including a ferromagnetic pinned layer and a ferromagnetic free layer, said sensor stack having a first overlay portion, a second overlay portion, and an active portion, said sensor stack having a first and second end, wherein the first and second overlay portions extend from the first and second ends of said sensor stack;

a first bias magnet disposed at said first end of said sensor stack and insulated from said sensor stack with a first thin insulating layer, said first bias magnet having bump extending upwardly from a top surface thereof and positioned towards said first end of said sensor stack;

a second bias magnet disposed at said second end of said sensor stack and insulated from said sensor stack with a second thin insulating layer, said second bias magnet having a bump extending upwardly from a top surface thereof and positioned towards said second end of said sensor stack;

a first lead, said first lead overlaying said first overlay portion of said sensor stack and said first bias magnet, wherein said first lead is insulated from said first bias magnet with a third insulating layer, wherein ends of said third insulating layer and said first insulating layer taper together and meet towards the first end of said sensor stack; and, a second lead, said second lead overlaying a second overlay portion of said sensor stack and said second bias magnet, wherein said second lead is insulated from said second bias magnet with a fourth insulating layer, wherein ends of said fourth insulating layer and said second insulating layer taper together and meet towards the second end of said sensor stack.

7. A disk drive as in claim 6 wherein said first lead has a substantially planar upper surface over said first portion of said sensor stack and said second lead has a substantially planar upper surface over said second portion of said sensor stack.

8. A disk drive as in claim 6 wherein said first and second lead comprises rhodium.

9. A disk drive as in claim 6 wherein said first and second lead comprises gold.

10. A disk drive as in claim 6 wherein said first and second lead comprises ruthenium.

* * * * *